US012332869B2

(12) United States Patent
Song

(10) Patent No.: US 12,332,869 B2
(45) Date of Patent: Jun. 17, 2025

(54) METHOD AND APPARATUS FOR LABELING DATA IN MACHINE TO MACHINE SYSTEM

(71) Applicants: Hyundai Motor Company, Seoul (KR); Kia Corporation, Seoul (KR); Industry Academy Cooperation Foundation of Sejong University, Seoul (KR)

(72) Inventor: Jae Seung Song, Seoul (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 26 days.

(21) Appl. No.: 17/942,737

(22) Filed: Sep. 12, 2022

(65) Prior Publication Data
US 2023/0120195 A1 Apr. 20, 2023

Related U.S. Application Data

(60) Provisional application No. 63/252,311, filed on Oct. 5, 2021.

(51) Int. Cl.
*G06F 16/22* (2019.01)
(52) U.S. Cl.
CPC ................ *G06F 16/2272* (2019.01)
(58) Field of Classification Search
CPC .......... H04W 4/70; H04L 67/12; G06F 16/22; G06F 16/2272; G06F 16/35; G06F 16/367; G06F 16/38; G06F 16/83; G06F 16/906; G06F 16/907; G06F 18/2178; G06F 18/2155; G06F 18/23; G06N 3/08; G06N 20/00; G06N 5/02
See application file for complete search history.

(56) References Cited

U.S. PATENT DOCUMENTS

| | | | |
|---|---|---|---|
| 11,638,115 B2* | 4/2023 | Bouba | H04W 4/029 455/456.3 |
| 2011/0022941 A1* | 1/2011 | Osborne | G06F 16/367 715/230 |
| 2018/0089328 A1* | 3/2018 | Bath | G06F 16/9538 |
| 2021/0019665 A1* | 1/2021 | Gur | G06N 20/00 |
| 2021/0073449 A1* | 3/2021 | Segev | G06F 30/27 |

(Continued)

OTHER PUBLICATIONS

OneM2M Technical Specification—TS-0001-V4.8.0—Functional Architecture—Nov. 16, 2020.
(Continued)

*Primary Examiner* — Robert W Beausoliel, Jr.
*Assistant Examiner* — Cheryl M Shechtman
(74) *Attorney, Agent, or Firm* — Fox Rothschild LLP

(57) ABSTRACT

An apparatus for labeling data in a machine-to-machine (M2M) system, and a method for operating the apparatus may include determining a label for data and generating a resource including information related to the label. The resource may include at least one of information indicating being training data, information indicating a type of an annotation, information indicating a format of labeling, information describing an annotation, information on an applied ontology, and information referencing the data.

19 Claims, 12 Drawing Sheets

(56) References Cited

U.S. PATENT DOCUMENTS

2021/0241153 A1* 8/2021 Branchaud-Charron ................
G06N 20/00
2021/0397895 A1* 12/2021 Sun .................. G06N 3/045
2022/0237504 A1* 7/2022 Zhang ................ G06N 3/04
2023/0116417 A1* 4/2023 Taccari ............ G06V 10/774
706/15

OTHER PUBLICATIONS

OneM2M Technical Specification—TS-0001-V3.15.1—Functional Architecture—May 7, 2019.

* cited by examiner

METHOD AND APPARATUS FOR LABELING DATA IN MACHINE TO MACHINE SYSTEM

CROSS REFERENCE TO RELATED APPLICATION

The present application claims priority to a U.S. provisional application 63/252,311, filed Oct. 5, 2021, the entire contents of which are incorporated herein for all purposes by this reference

BACKGROUND OF THE DISCLOSURE

Field of the Disclosure

The present disclosure relates to a machine-to-machine (M2M) system and, more particularly, to a method and apparatus for labeling data in an M2M system.

Description of the Related Art

Recently, introduction of Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" may be uniformly used for convenience of explanation, but the present disclosure may not be limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present disclosure may be directed to provide a method and apparatus for effectively labeling data in a machine-to-machine (M2M) system.

The present disclosure may be directed to provide a method and apparatus for effectively managing learning data for training of artificial intelligence (AI) models in an M2M system.

The present disclosure may be directed to provide a method and apparatus for generating learning data that may be shared for training different AI models in an M2M system.

According to an embodiment of the present disclosure, a method for operating a first device in a machine-to-machine (M2M) system may include determining a label for data and generating a resource including information related to the label. The resource may include at least one of first information indicating being training data, second information indicating a type of an annotation, third information indicating a format of labeling, fourth information describing an annotation, fifth information on an applied ontology, and sixth information referencing the data.

According to an embodiment of the present disclosure, a first device in an M2M system includes a transceiver and a processor coupled with the transceiver, wherein the processor may be configured to determine a label for data and to generate a resource including information related to the label, and wherein the resource may include at least one of first information indicating being training data, second information indicating a type of an annotation, third information indicating a format of labeling, fourth information describing an annotation, fifth information on an applied ontology, and sixth information referencing the data.

According to the present disclosure, a label license for data may be effectively managed in a machine-to-machine (M2M) system.

Effects obtained in the present disclosure may not be limited to the above-mentioned effects, and other effects not mentioned above may be clearly understood by those skilled in the art from the following description.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Figure 1:
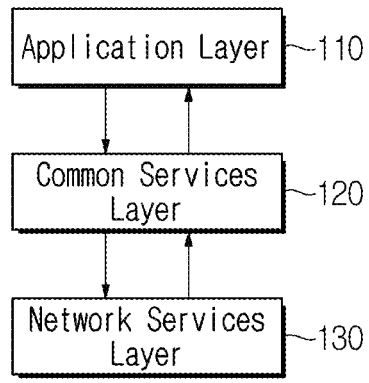
FIG. 1 illustrates a layered structure of a machine-to-machine (M2M) system according to the present disclosure.

It may be understood that the term "vehicle" or "vehicular" or other similar term as used herein may be inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle may be a vehicle that has two or more sources of power, for example both gasoline-powered and electric-powered vehicles.

The terminology used herein may be for the purpose of describing particular embodiments only and may not be intended to be limiting of the disclosure. As used herein, the singular forms "a," "an" and "the" may be intended to include the plural forms as well, unless the context clearly indicates otherwise. These terms may be merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and may be implemented by hardware components or software components and combinations thereof.

Although exemplary embodiment may be described as using a plurality of units to perform the exemplary process, it may be understood that the exemplary processes may also be performed by one or plurality of modules. Additionally, it may be understood that the term controller/control unit refers to a hardware device that includes a memory and a processor and may be specifically programmed to execute the processes described herein. The memory may be configured to store the modules and the processor may be specifically configured to execute said modules to perform one or more processes which may be described further below.

Further, the control logic of the present disclosure may be embodied as non-transitory computer readable media on a computer readable medium containing executable program instructions executed by a processor, controller or the like. Examples of computer readable media include, but may not be limited to, ROM, RAM, compact disc (CD)-ROMs, magnetic tapes, floppy disks, flash drives, smart cards and optical data storage devices. The computer readable medium may also be distributed in network coupled computer systems so that the computer readable media may be stored and executed in a distributed fashion, e.g., by a telematics server or a Controller Area Network (CAN).

Unless specifically stated or obvious from context, as used herein, the term "about" may be understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein may be modified by the term "about".

Hereinafter, embodiments of the present disclosure will be described in detail with reference to the accompanying drawings, which will be easily implemented by those skilled in the art. However, the present disclosure may be embodied in many different forms and may not be limited to the exemplary embodiments described herein.

In the present disclosure, the terms first, second, etc. may be used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component may be referred to as being "linked", "coupled", or "connected" to another component, it may be understood that not only a direct connection relationship but also an indirect connection relationship through an intermediate component may also be included. Also, when a component may be referred to as "comprising" or "having" another component, it may mean further inclusion of another component not the exclusion thereof, unless explicitly described to the contrary.

In the present disclosure, components that may be distinguished from each other may be intended to clearly illustrate each feature. However, it does not necessarily mean that the components may be separate. In other words, a plurality of components may be integrated into one hardware or software unit, or a single component may be distributed into a plurality of hardware or software units. Thus, unless otherwise noted, such integrated or distributed embodiments may be also included within the scope of the present disclosure.

In the present disclosure, components described in the various embodiments may not be necessarily essential components, and some may be optional components. Accordingly, embodiments consisting of a subset of the components described in one embodiment may be also included within the scope of the present disclosure. Also, exemplary embodiments that include other components in addition to the components described in the various exemplary embodiments may also be included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings may be omitted, and like parts may be denoted by similar reference numerals.

Although an exemplary embodiment may be described as using a plurality of units to perform the exemplary process, it may be understood that the exemplary processes may also be performed by one or plurality of modules. Additionally, it may be understood that the term controller/control unit refers to a hardware device that includes a memory and a processor and may be specifically programmed to execute the processes described herein. The memory may be configured to store the modules and the processor may be specifically configured to execute said modules to perform one or more processes which may be described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but may not be limited thereto. An M2M terminal may operate based on another wireless communication network and may not be limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and may not be limited to the embodiment described above.

In addition, for example, the present disclosure mainly describes an M2M system but may not be solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and may not be limited to the embodiment described above.

The present disclosure relates to a method and apparatus for performing labeling for data in a machine-to-machine (M2M) system. More particularly, the present disclosure describes a technology of managing information regarding a labeling procedure for generating learning data used for learning of an artificial intelligence (AI) model in an M2M system.

oneM2M may be a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers may be implemented in a common services layer between M2M applications and communication Hardware/Software (HW/SW) rendering data transmission. For example, a common services layer may be a part of a layered structure illustrated in FIG. 1.

FIG. 1 illustrates a layered structure of an Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that may be grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
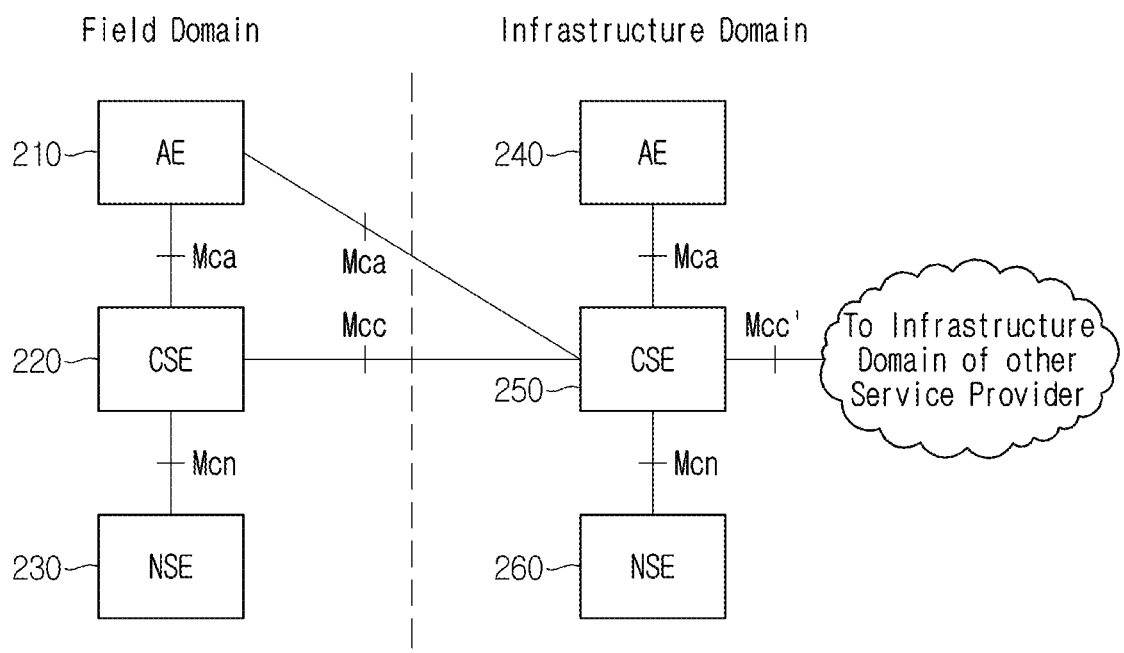
FIG. 2 illustrates a reference point in an M2M system according to the present disclosure.

FIG. 2 illustrates reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
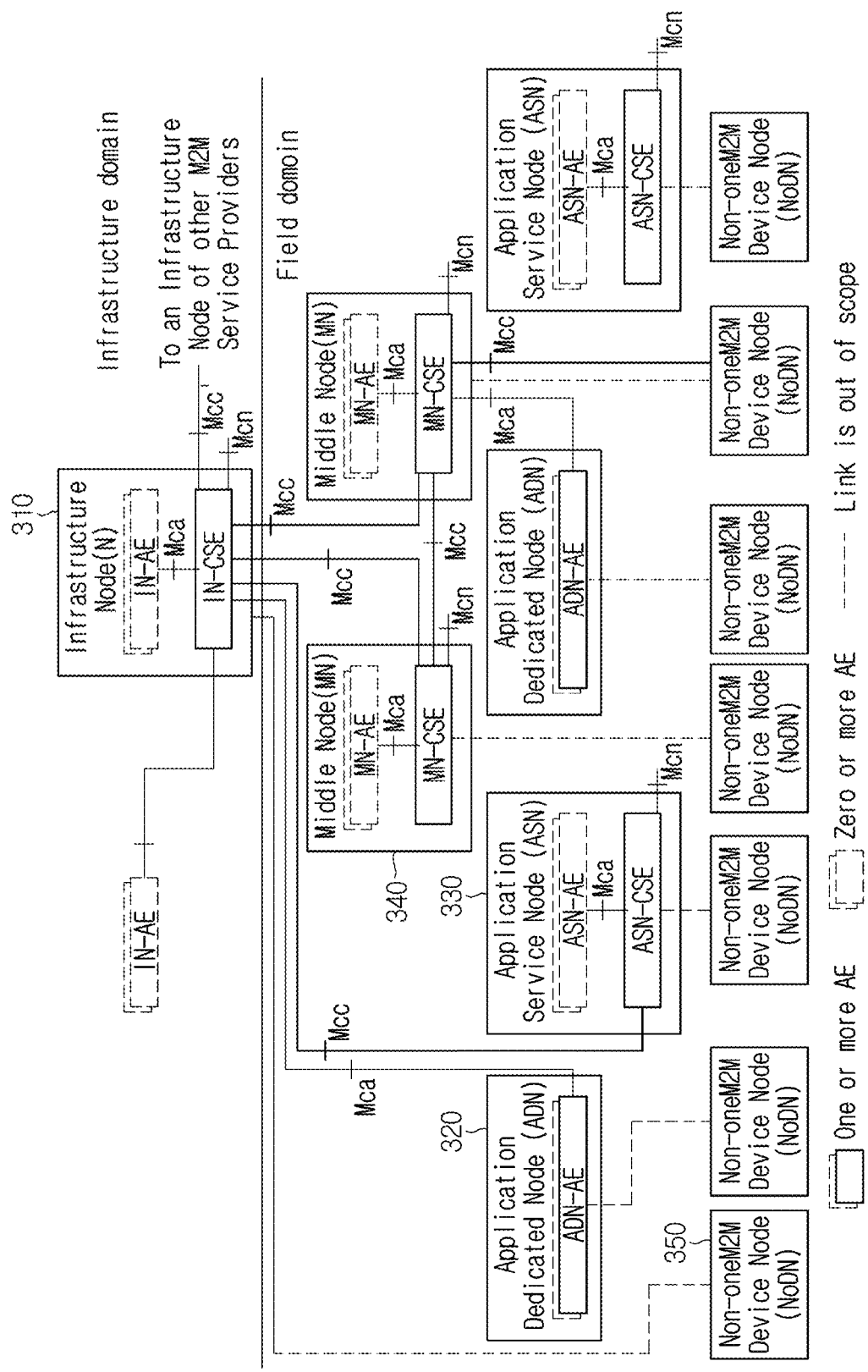
FIG. 3 illustrates each node in an M2M system according to the present disclosure.

FIG. 3 illustrates each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that may be set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that may be set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) may be a node that does not include M2M entities. It may be a node that performs management or collaboration together with an M2M system.

Figure 4:
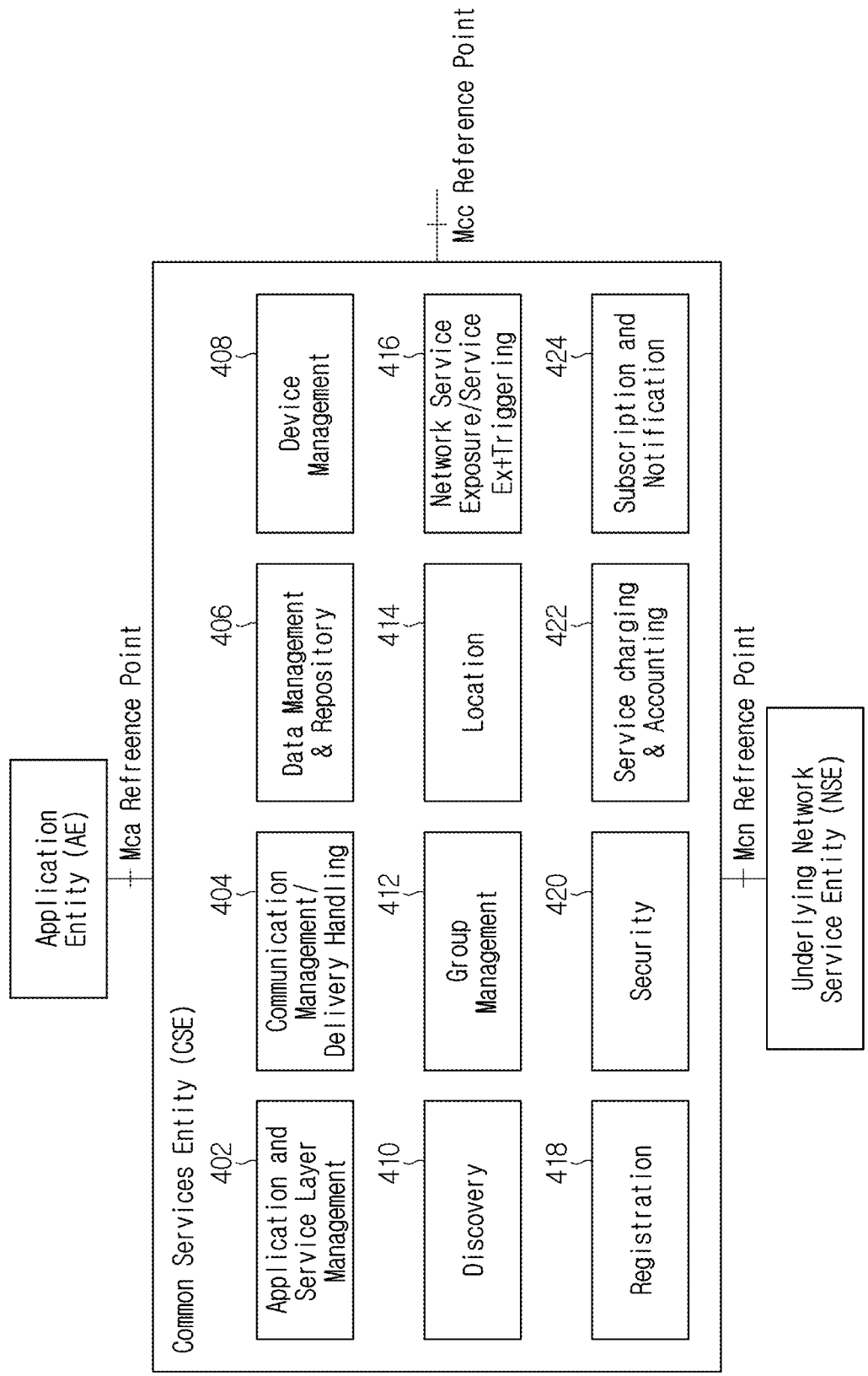
FIG. 4 illustrates a common service function in an M2M system according to the present disclosure.

FIG. 4 illustrates a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and may not be limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF may be configured to determine at what time and through what connection communications may be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF may be configured to provide an information retrieval function for applications and services based on filter criteria. The group management 412 CSF provides processing of group-related requests. The group management 412 CSF enables an M2M system to support bulk operations for many devices and applications. The location 414 CSF may be configured to enable AEs to obtain geographical location information.

The network service exposure/service execution and triggering 416 CSF manages communications with base networks for access to network service functions. The registration 418 CSF may be configured to provide AEs (or other remote CSEs) to a CSE. The registration 418 CSF allows AEs (or remote CSE) to use services of CSE. The security 420 CSF may be configured to provide a service layer with security functions like access control including identification, authentication and permission. The service charging and accounting 422 CSF may be configured to provide charging functions for a service layer. The subscription/notification 424 CSF may be configured to allow subscription to an event and notifying the occurrence of the event.

Figure 5:
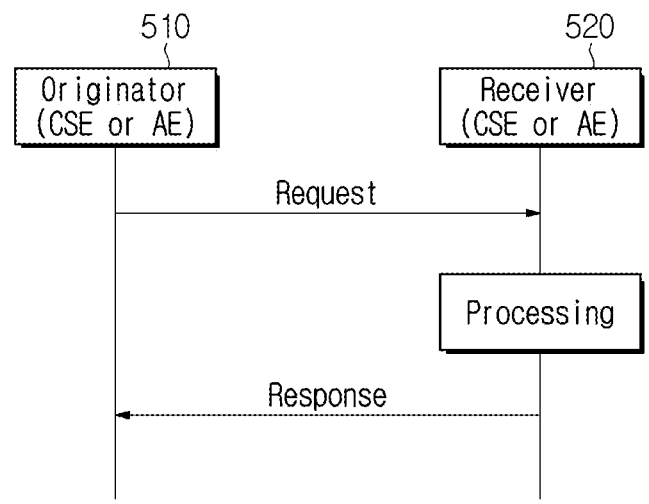
FIG. 5 illustrates a method in which an originator and a receiver exchange a message in an M2M system according to the present disclosure.

FIG. 5 illustrates an exchange of a message between an originator and a receiver in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 may not be limited to M2M terminals but may be other terminals. They may not be limited to the above-described exemplary embodiment. In addition, for example, the originator 510 and the receiver 520 may be nodes, entities, servers or gateways, which may be described above. In other words, the originator 510 and the receiver 520 may be hardware or software configurations and may not be limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete or Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter may be valid and authorized. In particular, in response to determining that a parameter may be valid and authorized, the receiver 520 may be configured to check whether there may be a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code-successful, unsuccessful, ack
Request Identifier-uniquely identifies a Request message TABLE 1-continued Response message parameter/success or not Content-to be transferred
To-the identifier of the Originator or the Transit CSE that sent the corresponding non-blocking request
From-the identifier of the Receiver
Originating Timestamp-when the message was built
Result Expiration Timestamp-when the message expires
Event Category-what event category shall be used for the response message
Content Status
Content Offset TABLE 1-continued Response message parameter/success or not Token Request Information
Assigned Token Identifiers
Authorization Signature Request Information
Release Version Indicator-the oneM2M release version that this response message conforms to A filter criteria condition, which may be used in a request message or a response message, may be defined as in Table 2 and Table 3 below.

TABLE 2

| Condition tag | Multi-plicity | Description |
| --- | --- | --- |
| Matching Conditions | | |
| createdBefore | 0..1 | The creation Time attribute of the matched resource is chronologically before the specified value. |
| created After | 0..1 | The creation Time attribute of the matched resource is chronologically after the specified value. |
| modifiedSince | 0..1 | The lastModifiedTime attribute of the matched resource is chronologically after the specified value. |
| unmodifiedSince | 0..1 | The lastModifiedTime attribute of the matched resource is chronologically before the specified value. |
| stateTagSmaller | 0..1 | The stateTag attribute of the matched resource is smaller than the specified value. |
| state TagBigger | 0..1 | The stateTag attribute of the matched resource is bigger than the specified value. |
| expireBefore | 0..1 | The expiration Time attribute of the matched resource is chronologically before the specified value. |
| expireAfter | 0..1 | The expiration Time attribute of the matched resource is chronologically after the specified value. |
| labels | 0..1 | The labels attribute of the matched resource matches the specified value. |
| labelsQuery | 0..1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. |
| childLabels | 0..1 | A child of the matched resource has labels attributes matching the specified value. The evaluation is the same as for the labels attribute above. |
| parentLabels | 0..1 | The parent of the matched resource has labels attributes matching the specified value. The evaluation is the same as for the labels attribute above. |
| resourceType | 0..n | The resourceType attribute of the matched resource is the same as the specified value. It also allows differentiating between normal and announced resources. |
| childResourceType | 0..n | A child of the matched resource has the resourceType attribute the same as the specified value. |
| parentResourceType | 0..1 | The parent of the matched resource has the resourceType attribute the same as the specified value. |
| sizeAbove | 0..1 | The contentSize attribute of the <contentInstance> matched resource is equal to or greater than the specified value. |
| sizeBelow | 0..1 | The contentSize attribute of the <contentInstance> matched resource is smaller than the specified value. |
| contentType | 0..n | The contentInfo attribute of the <contentInstance> matched resource matches the specified value. |
| attribute | 0..n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator =* Sam" |
| childAttribute | 0..n | A child of the matched resource meets the condition provided. The evaluation of this condition is similar to the attribute matching condition above. |
| parentAttribute | 0..n | The parent of the matched resource meets the condition provided. The evaluation of this condition is similar to the attribute matching condition above. |
| semanticsFilter | 0..n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the |

TABLE 2-continued

| Condition tag | Multi-plicity | Description |
|---|---|---|
| | | request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0..1 | Indicates the logical operation (AND/OR) to be used for different condition tags. The default value is logical AND. |
| contentFilterSyntax | 0..1 | Indicates the Identifier for syntax to be applied for content-based discovery. |
| contentFilterQuery | 0..1 | The query string shall be specified when contentFilterSyntax parameter is present. |

TABLE 3

| Condition tag | Multiplicity Description | Filter Handling Conditions |
|---|---|---|
| filterUsage | 0..1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0..1 | The maximum number of resources to be included in the filtering result. This may be modified by the Hosting CSE. When it is modified, then the new value shall be smaller than the suggested value by the Originator. |
| level | 0..1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0..1 | The number of direct child and descendant resources that a Hosting CSE shall skip over and not include within a Retrieve response when processing a Retrieve request to a targeted resource. |
| applyRelativePath | 0..1 | This attribute contains a resource tree relative path (e.g.../tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

Request message parameter

| | |
|---|---|
| Mandatory | Operation-operation to be executed/CREAT, Retrieve, Update, Delete, Notify<br>To-the address of the target resource on the target CSE<br>From-the identifier of the message Originator<br>Request Identifier-uniquely identifies a Request message |
| Operation dependent<br>Optional | Content-to be transferred<br>Resource Type-of resource to be created<br>Originating Timestamp-when the message was built<br>Request Expiration Timestamp-when the request message expires<br>Result Expiration Timestamp-when the result message expires<br>Operational Execution Time-the time when the specified operation is to be executed by the target CSE<br>Response Type-type of response that shall be sent to the Originator<br>Result Persistence-the duration for which the reference containing the responses is to persist<br>Result Content-the expected components of the result<br>Event Category-indicates how and when the system should deliver the message<br>Delivery Aggregation-aggregation of requests to the same target CSE is to be used<br>Group Request Identifier-Identifier added to the group request that is to be fanned out to each member of the group<br>Group Request Target Members-indicates subset of members of a group<br>Filter Criteria-conditions for filtered retrieve operation<br>Desired Identifier Result Type-format of resource identifiers returned<br>Token Request Indicator-indicating that the Originator may attempt Token Request procedure (for Dynamic Authorization) if initiated by the Receiver<br>Tokens-for use in dynamic authorization<br>Token IDs-for use in dynamic authorization<br>Role IDs-for use in role based access control<br>Local Token IDs-for use in dynamic authorization<br>Authorization Signature Indicator-for use in Authorization Relationship Mapping<br>Authorization Signature-for use in Authorization Relationship Mapping<br>Authorization Relationship Indicator-for use in Authorization Relationship Mapping<br>Semantic Query Indicator-for use in semantic queries<br>Release Version Indicator-the oneM2M release version that this request message conforms to.<br>Vendor Information |

A normal resource includes a complete set of representations of data constituting the base of information to be managed. Unless qualified as either "virtual" or "announced", the resource types in the present document may be normal resources. A virtual resource may be used to trigger processing and/or a retrieve result. However, a virtual resource may not have a permanent representation in a CSE. An announced resource may contain a set of attributes of an original resource. When an original resource changes, an announced resource may be automatically updated by the hosting CSE of the original resource. The announced resource contains a link to the original resource. Resource announcement enables resource discovery. An announced resource at a remote CSE may be used to create a child resource at a remote CSE, which may not be present as a child of an original resource or may not be an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Many artificial intelligence (AI) and machine learning (ML) applications use data collected in IoT platforms to train their model. An IoT platform which includes a oneM2M system, may be a place holder to collect and manage various data (e.g., image, text, sensor data). Data labeling may be an essential step in a supervised machine learning task. Data labeling may be a process of identifying raw data (e.g., images, text files, videos, etc.) and adding at least one or more meaningful and informative labels in order to provide a context.

Data labeling may be a task that requires a lot of manual works. If an IoT platform provides a means to support data labeling, developers will be able to save time and resources. For example, labels for data indicate whether data contains the temperature of a room, or whether an X-ray contains a tumor.

Table 5 shows types of annotations used as labels.

TABLE 5

| Type | Description |
|---|---|
| Bounding box | Use rectangular boxes to define the location of the target object. |
| Polygonal segmentation | Complex polygons are used to define the shape and location of an object in a more precise way. |
| Semantic segmentation | A pixel wise annotation technique where every pixel in an image is assigned to a class. |
| 3D cuboids | Similar to bounding boxes but have additional depth information about an object. |

TABLE 5-continued

| Type | Description |
| --- | --- |
| Lines and splines | Annotation is created using lines and splines. |
| Key-point and landmark | Detect small objects and shape variations by creating dots across the image. |
| Customization | Depending on data, various annotations can be used. For example, when a network packet is data, header field information (e.g., base address, offset, field description) can be used for label. |

Figure 6A:
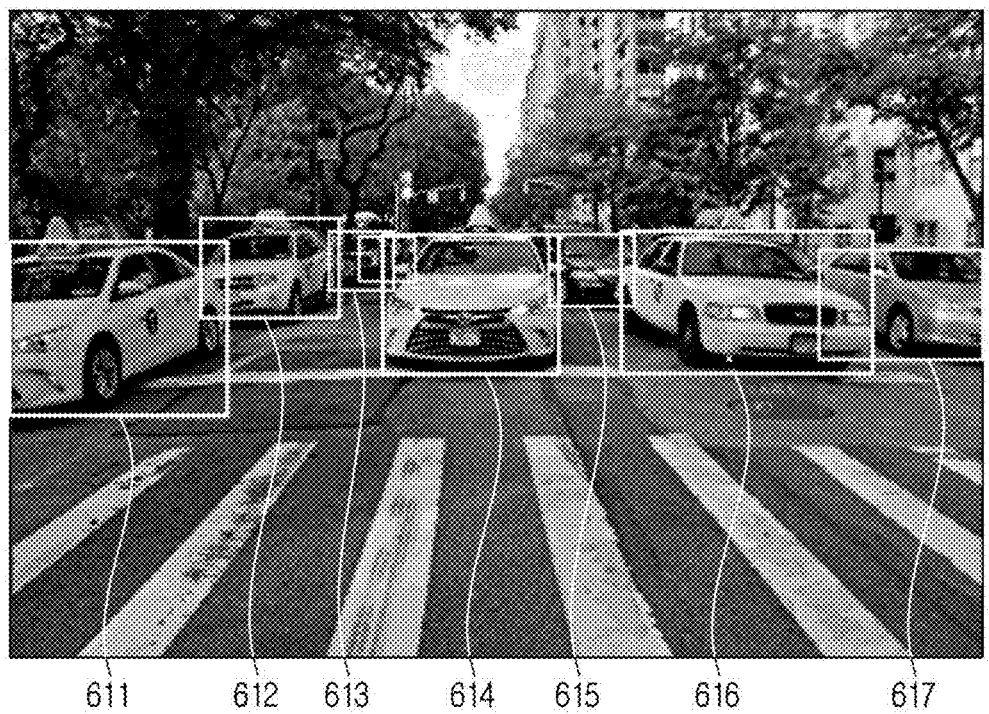
FIG. 6A to FIG. 6E illustrate examples of label types available in an M2M system according to the present disclosure.

FIG. 6A to FIG. 6E show specific examples of the types of annotations listed in Table 5. FIG. 6A to FIG. 6E illustrate examples of label types available in an M2M system according to the present disclosure. FIG. 6A exemplifies bounding boxes, FIG. 6B exemplifies a polygon, FIG. 6C exemplifies semantic segmentation, FIG. 6D exemplifies a 3D cuboid, and FIG. 6E exemplifies a line and a spline.

Referring to FIG. 6A, labels 611 to 617 may be added which indicate vehicles in an image. Herein, the labels 611 to 617 may be represented as bounding boxes that specify corresponding regions in rectangles.

Figure 6B:
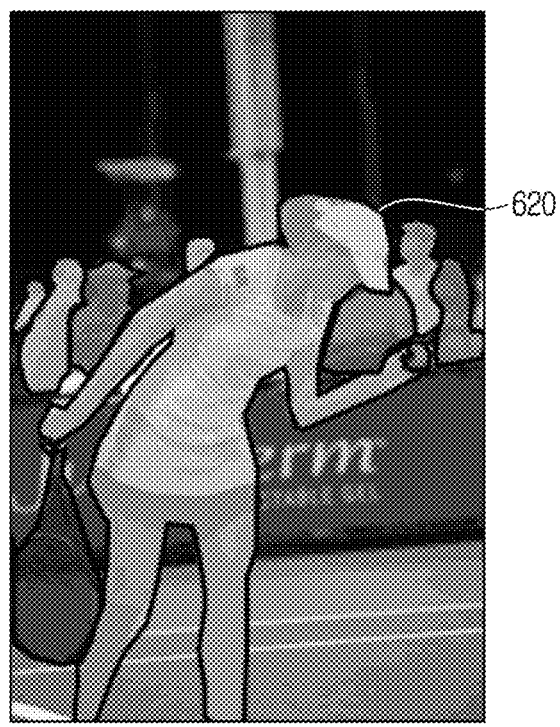

Referring to FIG. 6B, a label 620 may be added which indicates each person in an image. Herein, the label 620 may be represented in a polygonal form that specifies a boundary of pixels expressing a person.

Figure 6C:
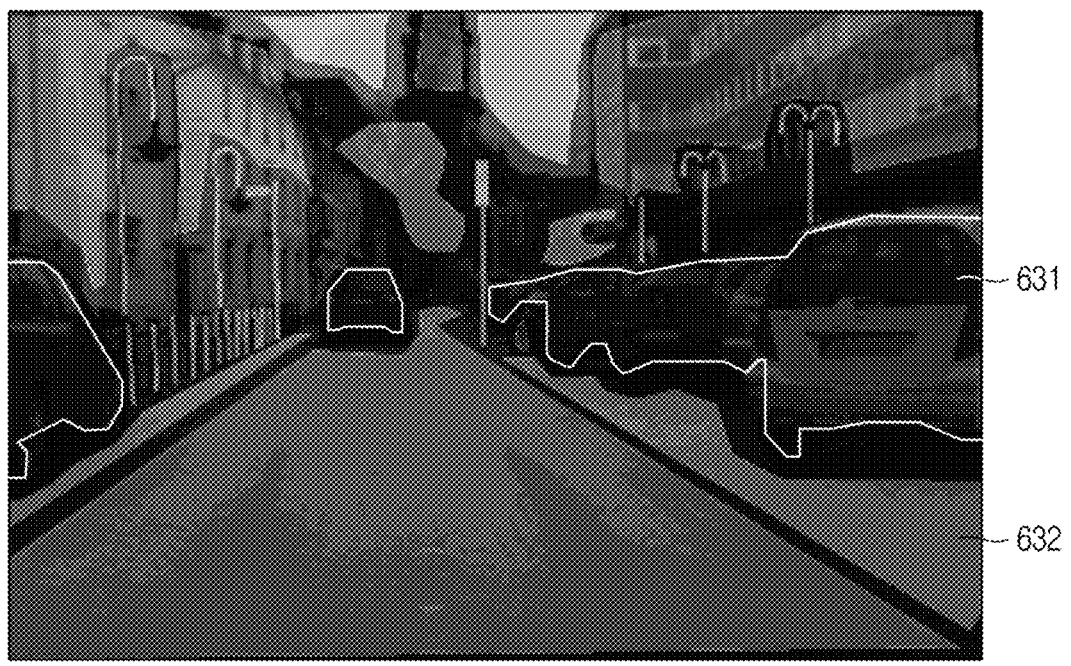

Referring to FIG. 6C, labels 631 to 632 may be added which distinguish things such as a vehicle, a road, a road facility and a building in an image. Herein, the labels 631 to 632 may be represented as semantic segmentations that specify a range of each thing.

Figure 6D:
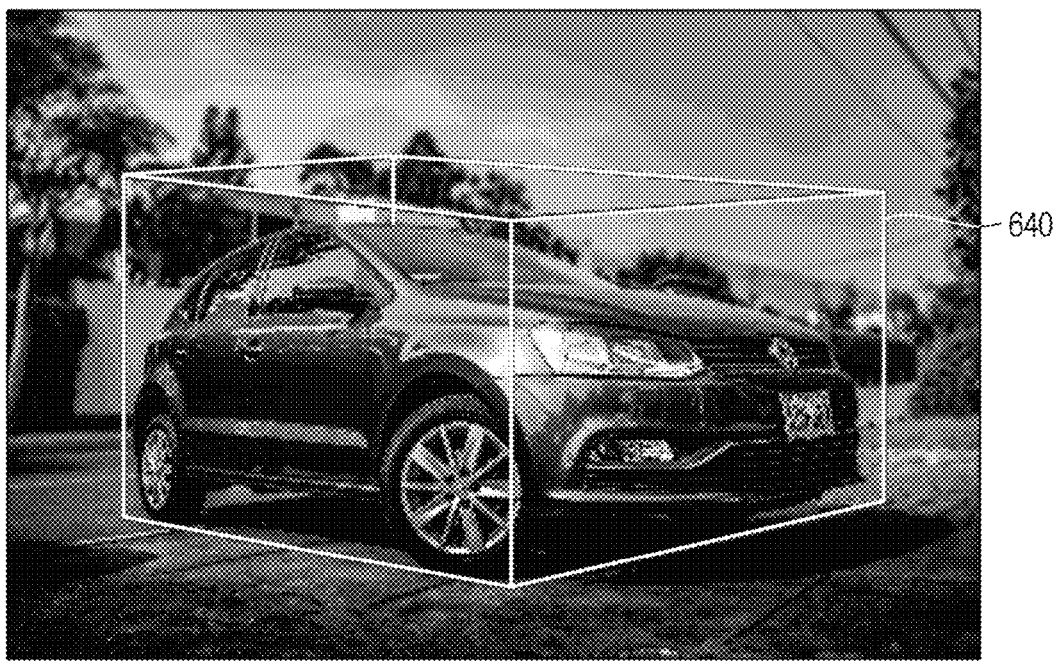

Referring to FIG. 6D, a label 640 may be added which indicates a 3D space occupied by a vehicle in an image. Herein, the label 640 may be represented as a 3D cube.

Figure 6E:
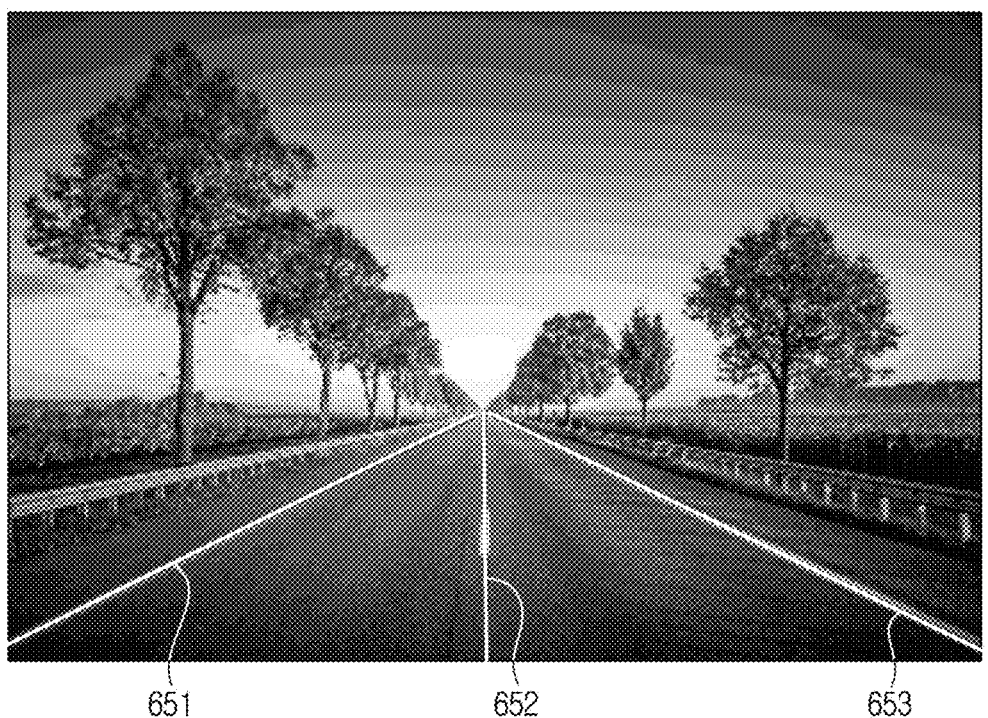

Referring to FIG. 6E, labels 651 to 653 may be added which indicate lanes on a road in an image. Herein, the labels 651 to 653 may be represented as lines.

At the moment there may be no single standard format to annotate raw data. Some currently available annotation formats may be as follows. COCO (common objects in context) has five annotation types, including object detection, keypoint detection, stuff segmentation, panoptic segmentation, and image captioning, and annotations may be stored using JSON. Pascal VOC (visual object classes) stores annotations in XML file. In YOLO (you only look once) labeling format, a txt file with a same name may be created for each image file in the same directory, and each txt file contains annotations (e.g., object class, object coordinates, height, and width) for a corresponding image file. Depending on which data needs an annotation, an AI/ML developer may define a customized labeling format.

Accordingly, the present disclosure proposes a oneM2M platform to support data labeling for AL/ML. For this, the following information may be newly defined:

Type of data to inform that a data (set) may be for training.
Labeling type to describe how labeling may be to be performed (e.g., square, polygon, line, landmark, custom).
Labeling metadata to provide detailed and meaningful information for data and labeling
Ontology information used to describe labeling information An ontology means a technology for denoting modeled objects or entities in a standard common language, when a thing or a domain may be modeled, and for denoting a relationship (e.g., ownership, referencing, kinship, etc.) between objects or entities in a standard common language. An ontology may be a technology widely used in a semantic web. For example, when the apply may be a fruit and may be born in an apple tree, such a relationship between an apple and an apple tree may be described in a standard language. In the case of an artificial intelligence (AI), labeling may be required to describe learning data, and an ontology technology may be applied to labeling. In this case, as a description about an annotation included in a label may be based on a corresponding ontology, labels created by different subjects may be shared and reused among them.

In case that a oneM2M system supports the above-described functions, a tool application for AI/ML data labeling may create and manage resource(s) to add labeling information on training data (set). Herein, it may be assumed that a oneM2M platform holds all the data for training. According to an embodiment, the labeling tool (e.g., oneM2M application) creates a resource(s) for data labeling. An application requests to update data labeling resources. Another application for an AI/ML model uses a training data set with label information to build a model.

According to various embodiments of the present disclosure, a resource may be used which includes information related to an annotation or a label. An entity (e.g., CSE) managing learning data may collect raw data and store a label for the collected raw data in a resource form. According to an embodiment, in order to store information related to a label, resources or attributes shown in Table 6 below may be used.

TABLE 6

| Items | Description | Example names |
| --- | --- | --- |
| Data type | Confirm that data is for training | trainingData |
| Label type | Indicate a labeling type (e.g. Square, polygon, line) | labelingType |
| Label format | There exist many labeling formats such as COCO, YOLO, Pascal VOC, custom. | labelAnnotationFormat |
| Label | Contain actual annotation contents according to a given format (e.g., XML, JSON, etc.) | labelAnnotationContents |
| Ontology information | Reference ontology used in data label annotation | refOntology |

At least one of the resources listed in Table 7 may be included in a resource associated with raw data or training data. A structure of a resource including information related to a label may be defined in various ways. For example, a resource including information related to a label may have a structure in FIG. 7, FIG. 8, FIG. 9 or FIG. 10.

Figure 7:
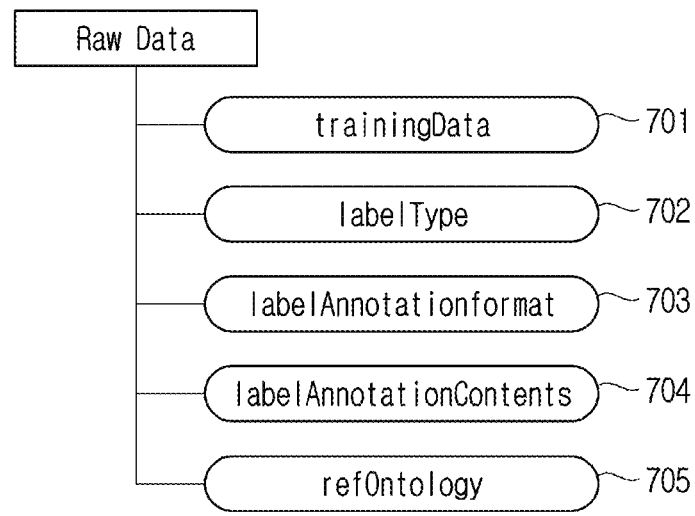
FIG. 7 illustrates an example of a resource including a data label in an M2M system according to the present disclosure.

FIG. 7 illustrates an example of a resource including a data label in an M2M system according to the present disclosure. FIG. 7 exemplifies a structure in which a data label may be included in a resource including raw data.

Referring to FIG. 7, a resource <Raw Data> includes resources <trainingData> 701, <labelType> 702, <labelAnnotationFormat> 703, <label AnnotationContents> 704 and <refOntology> 705. According to the structure of FIG. 7, labels, which may be specified by the resources <trainingData> 701, <labelType> 702, <labelAnnotationFormat> 703, <labelAnnotationContents> 704 and <refOntology> 705, may be interpreted to be labels or annotations for data included in the resource <Raw Date>.

Figure 8:
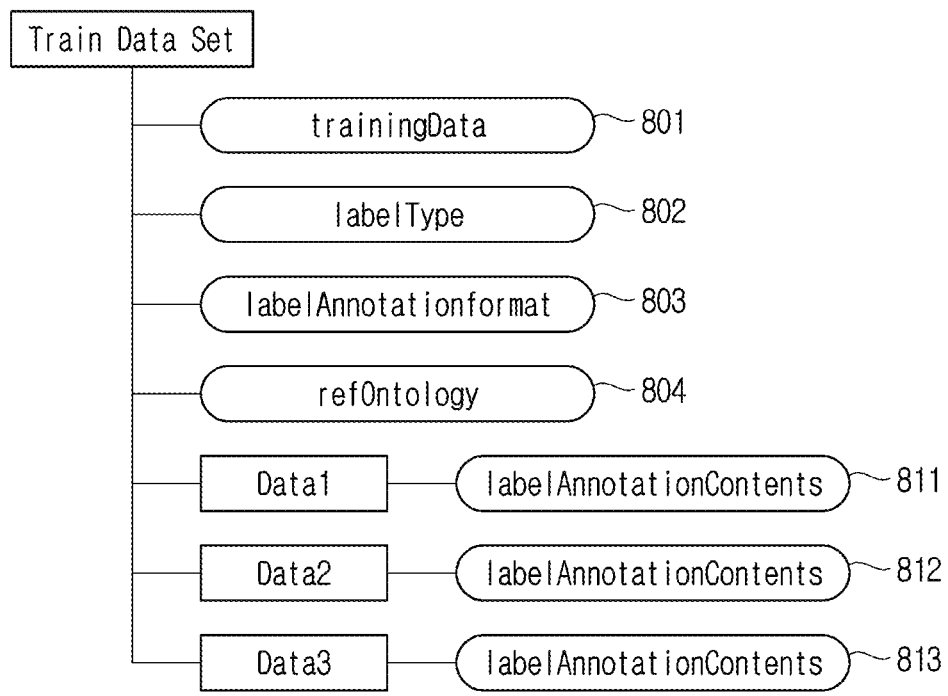
FIG. 8 illustrates another example of a resource including a data label in an M2M system according to the present disclosure.

FIG. 8 illustrates another example of a resource including a data label in an M2M system according to the present disclosure. FIG. 7 exemplifies a structure in which a data label may be included in a resource including a training data set. Referring to FIG. 8, a resource <Train Data Set> includes resources <trainingData> 801, <labelType> 802, <labelAnnotationformat> 803, <refOntology> 805, <labelAnnotationContents> 811 for data 1, <labelAnnotationContents> 812 for data 2, and <labelAnnotationContents> 813 for data 3. According to the structure of FIG. 8, <trainingData> 801, <labelType> 802, <labelAnnotationformat> 803, and <refOntology> 805 may be commonly applied to every label in the resource <Train Data Set>. In addition, <label AnnotationContents> 811, 812 or 813 including an annotation may be generated as a sub-resource of corresponding data.

Figure 9:
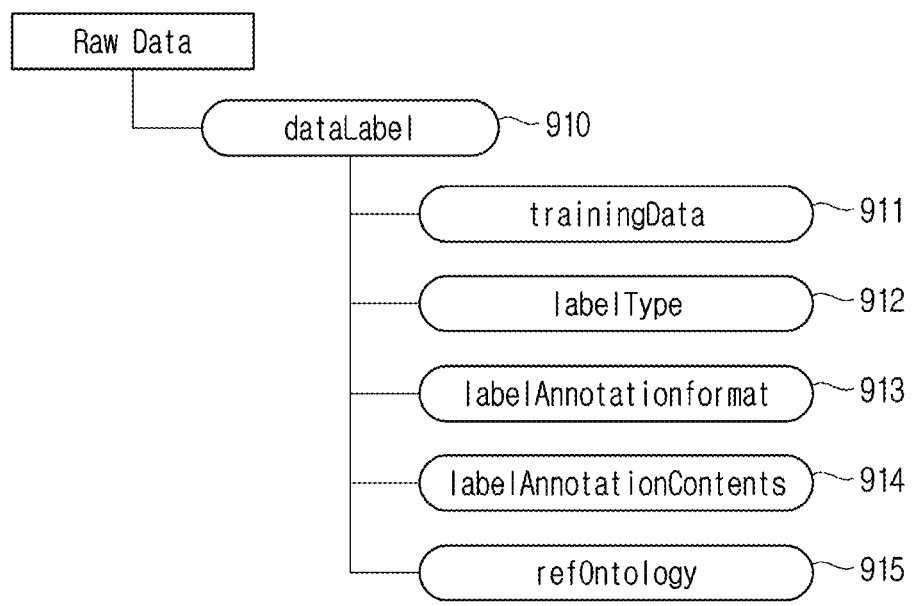
FIG. 9 illustrates yet another example of a resource including a data label in an M2M system according to the present disclosure.

FIG. 9 illustrates yet another example of a resource including a data label in an M2M system according to the present disclosure. FIG. 9 exemplifies a structure in which a data label may be included in a resource including raw data. Referring to FIG. 9, a resource <Raw Data> includes a resource <dataLabel> 910, and the resource <dataLabel> 910 includes resources <trainingData> 911, <labelType> 912, <label AnnotationFormat> 913, <label AnnotationContents> 914 and <refOntology> 915. According to the structure of FIG. 9, <dataLabel> 910, which may be a parent resource, may be further introduced as a container of label-related resources. <dataLabel> 910 includes sub-resources. According to another embodiment, the sub-resources <trainingData> 911, <labelType> 912, <labelAnnotationFormat> 913, <labelAnnotationContents> 914 and <refOntology> 915 may be embodied as attributes.

Figure 10:
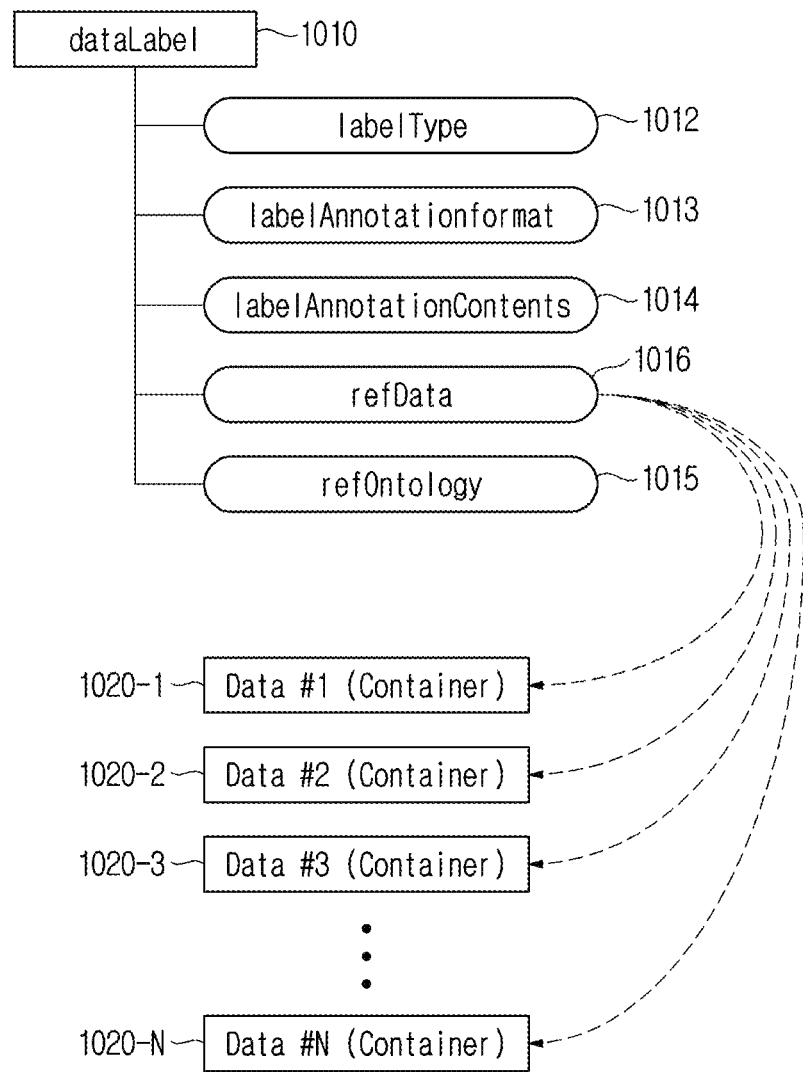
FIG. 10 illustrates yet another example of a resource including a data label in an M2M system according to the present disclosure.

FIG. 10 illustrates yet another example of a resource including a data label in an M2M system according to the present disclosure. FIG. 10 exemplifies a case in which reference information may be used for a plurality of data sets labeled with a same type of annotations. Referring to FIG. 10, a resource <dataLabel> 1010 includes resources <labelType> 1021, <labelAnnotationformat> 1013, <labelAnnotationContents> 1014, <refOntology> 1015, and <refData> 1016. According to the structure of FIG. 10, <dataLabel> 1010 itself does not include raw data but includes <refData> 1016 that includes information indicating data 1020-1 to 1020-N. In this case, the resource <dataLabel> 1010 may be shared in a large set of training data that has a same label. Generally, data sets including same information (e.g., 10 images including apples) share much data label information.

According to an embodiment, the resource <labelAnnotationContents> 1014 and the resource <refData> 1016 may include a list of referencing data. For example, the resource <Data #1> 1020-1 may include an image annotated with an apple, and the apple may be located on the right in the image. The resource <Data #2> 1020-2 may also include an image annotated with an apple, and the apple may be located on the left in the image. In this case, the resource <labelAnnotationContents> 1014 may be set to 'Apple (right)|Apple (left)|Apple (center)| . . . ', and the resource <refData> 1016 may be set to 'Data #1|Data #2|Data #3| . . . '. That is, reference values in <label AnnotationContents> 1014 and values describing an annotation in <refData> 1016 may be matched to each other in an order.

Figure 11:
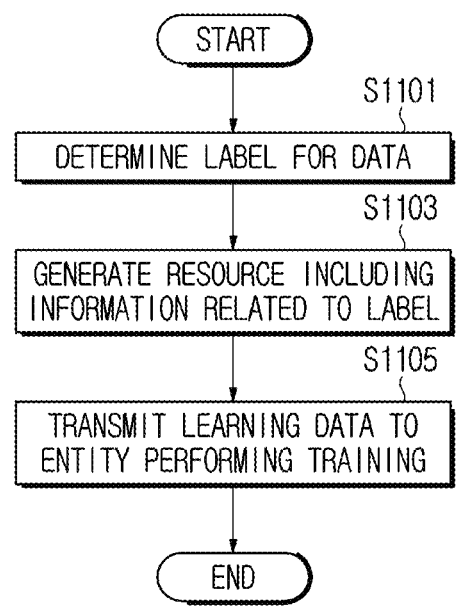
FIG. 11 illustrates an example of a procedure for managing learning data in an M2M system according to the present disclosure.

FIG. 11 illustrates an example of a procedure for managing learning data in an M2M system according to the present disclosure. The operation subject of FIG. 11 may be a device that executes a CSE for managing learning data. In the description below, the operation subject of FIG. 11 may be referred to as 'device'.

Referring to FIG. 11, at step S1101, a device determines a label for data. That is, the device acquires a label for raw data. According to an embodiment, the device may extract a label from data that is already labeled. In this case, the labeled data is created by a third-party device, and it does not matter which process created the labeled data. According to another embodiment, the device may provide raw data to another device and receive a label as feedback. Herein, the raw data may be provided as a response to a request from the another device.

At step S1103, the device creates a resource that contains information related to the label. The device confirms at least one attribute of the determined label and creates at least one resource that contains a value expressing the at least one attribute thus confirmed. For example, the at least one resource may include at least one of information indicating being training data, information indicating a type of a label or an annotation, information indicating a format of labeling, information describing a label annotation (e.g., a size of an annotation, a shape of an annotation, location information of an annotation, etc), information on an applied ontology (e.g., an identifier of one of candidate ontologies), and information referencing raw data (e.g., address, link, etc.). Accordingly, the device has labeled data as learning data.

At step S1105, the device transmits the learning data to an entity that performs training. That is, the device may provide the learning data to another device that requires learning data. For example, the device may receive a request for learning data from another device and transmit learning data in response to the request. Herein, an amount or range of the learning data that is provided may be determined based on the capability, class and the like of the device that requests the learning data.

As described with reference to FIG. 7 to FIG. 10, various structures of resources may be applied. In addition, a resource with a different structure may be used to manage learning data. That is, a proposed solution may be optimized. Specifically, multiple container resources may be referred to as a single <dataLabel> resource. In addition, in data labeling, how semantics and ontology will be used may be further considered.

Figure 12:
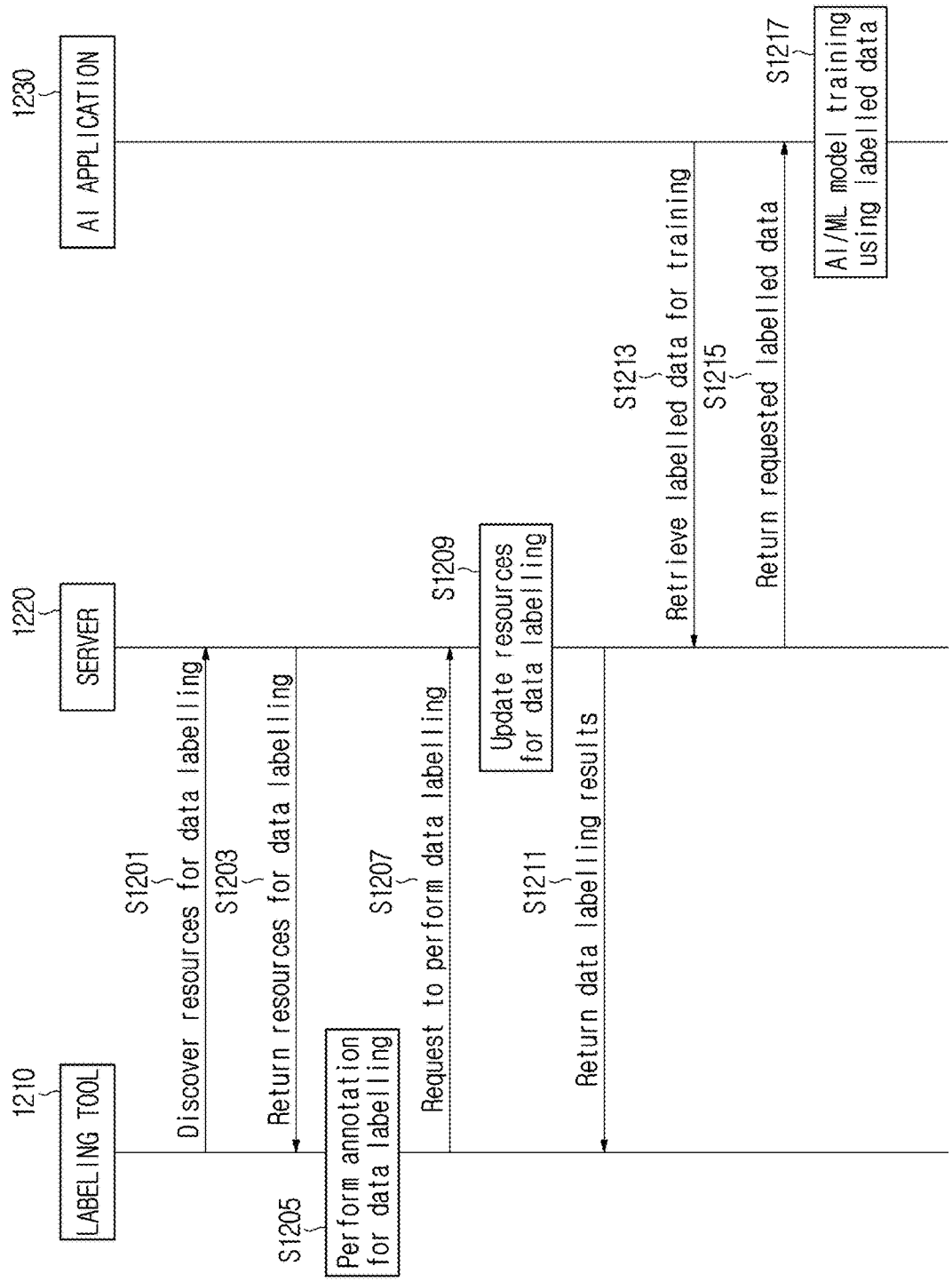
FIG. 12 illustrates a procedure for supporting learning of an artificial intelligence (AI) model in an M2M system according to the present disclosure.

FIG. 12 illustrates a procedure for supporting learning of an artificial intelligence (AI) model in an M2M system according to the present disclosure. FIG. 12 exemplifies signal exchange among a labeling tool 1210, a server 1220, and an AI application 1230. The labeling tool 1210 is an entity that performs a function of annotating raw data with a label, and the AI application 1230 is an entity that performs training for an AI model or prediction using an AI model. The server 1220 includes a CSE for managing learning data.

Referring to FIG. 12, at step S1201, the labeling tool 1210 transmits a first message for discovering a resource for data labeling to the server 1220. That is, the server 1220 has resources including unlabeled raw data. Raw data may include an image, audio data, a measured value and the like, which are collected from various M2M devices. According to an embodiment, the first message may include at least one of information on a type of data that can be labeled in the labeling tool 1210, information on an annotation to be added, and information on a required amount of data.

At step S1203, the server 1220 transmits a second message for returning a resource for data labeling to the labeling tool 1210. That is, the server 1220 provides data to be labeled. The second message may include data or include information for accessing a resource including data. According to an embodiment, the second message may include at least one of information on a required label, information on a labeling target, and information on a type of annotation. For example, through the second message, the server 1220 may request to label a vehicle in a bounding box in a provided image.

At step S1205, the labeling tool 1210 performs annotation for data labeling. Herein, an annotation may be added according to a user's command. For example, the labeling tool 1210 may provide the user with an interface for adding an annotation and perform labeling by adding an annotation to a location that is designated according to an input from the user. Herein, according to an embodiment, the labeling tool 1210 may provide an interface for inputting a type of annotation that is requested by the second message. Thus, the labeling tool 1210 may create a label for data received from the server 1220.

At step S1207, the labeling tool 1210 transmits a third message for requesting to perform data labeling to the server 1220. In other words, the labeling tool 1210 requests to update a resource including data by using an input annotation. That is, the labeling tool 1210 requests to create a resource associated with a label. For this, the third message may include the label that is created at step S1205. For example, the third message may include only a label or include both data and a label. Herein, according to an embodiment, when data includes a plurality of files (e.g., images) and at least one label is created in each file, the third message may further include information indicating mapping between files and labels.

At step S1209, the server 1220 updates resources for data labeling. The server 1220 updates a resource including data by using a received label. That is, the server 1220 generates a resource associated with a label. According to an embodiment, the updated resource may include at least one of information indicating being training data, information indicating a type of a label or an annotation, information indicating a format of labeling, information describing a label annotation (e.g., a size of an annotation, a shape of an annotation, location information of an annotation, etc), and information on an applied ontology (e.g., an identifier of one of candidate ontologies).

At step S1211, the server 1220 transmits a fourth message for returning a data labeling result to the labeling tool 1210. The fourth message notifies that a resource is updated. That is, the fourth message notifies that a resource is generated which includes information on a label provided by the labeling tool 1210. Accordingly, the labeling tool 1210 may grasp that provided labels are stored in the server 1220.

At step S1213, the AI application 1230 transmits a fifth message for retrieving labeled data for training to the server 1220. In other words, the AI application 1230 requests learning data for training an AI model. For this, the fifth message includes information indicating an attribute of learning data that is required in the AI application 1230. For example, the fifth message may include at least one of information on an AI model, which is to be trained in the AI application 1230, information on a type of annotation, and information on input data.

At step S1215, the server 1220 transmits a sixth message for returning requested and labeled data to the AI application 1230. The server 1220 transmits the sixth message including labeled data, that is, learning data. The sixth message includes learning data with the attribute requested at step S1213. For this, the server 1220 may confirm learning data with an attribute requested by the AI application 1230 by using information included in a resource associated with a label and provide at least a part of the confirmed learning data to the AI application 1230.

At step S1217, the AI application 1230 performs training for an AI/ML model by using labeled data. The AI application 1230 may perform a predictive operation using labeled data, determine a loss value for an output based on a label, and then update the AI/ML learning model based on the loss value. Thus, the AI application 1230 may be in a state capable of performing a predictive operation using the AI/ML model.

Figure 13:
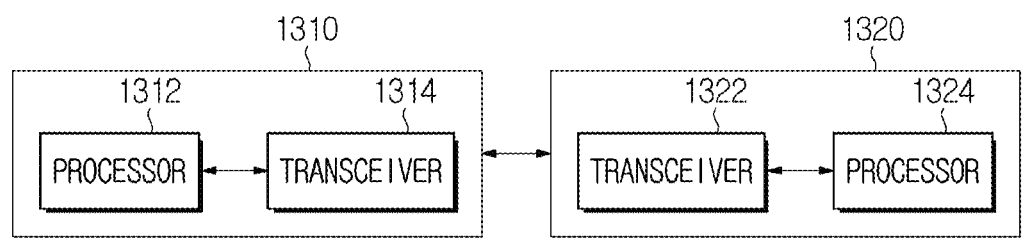
FIG. 13 illustrates a configuration of an M2M device in an M2M system according to the present disclosure.

FIG. 13 illustrates a configuration of an M2M device in an M2M system according to the present disclosure. An M2M device 1310 or an M2M device 1320 illustrated in FIG. 13 may be understood as hardware functioning as at least one among the above-described AE, CSE and NSE.

Referring to FIG. 13, the M2M device 1310 may include a processor 1312 controlling a device and a transceiver 1314 transmitting and receiving a signal. Herein, the processor 1312 may control the transceiver 1314. In addition, the M2M device 1310 may communicate with another M2M device 1320. The another M2M device 1320 may also include a processor 1322 and a transceiver 1324, and the processor 1322 and the transceiver 1324 may perform the same function as the processor 1312 and the transceiver 1314.

As an example, the originator, the receiver, AE and CSE, which may be described above, may be one of the M2M devices 1310 and 1320 of FIG. 13, respectively. In addition, the devices 1310 and 1320 of FIG. 13 may be other devices. As an example, the devices 1310 and 1320 of FIG. 13 may be communication devices, vehicles, or base stations. That is, the devices 1310 and 1320 of FIG. 13 refer to devices capable of performing communication and may not be limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations may be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure may be explained, and the description of both disclosures may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure may be defined by the appended claims rather than by the foregoing description, and all differences within the scope of equivalents thereof should be construed as being included in the present disclosure.

What is claimed is:

1. A method for operating a first device in a machine-to-machine (M2M) system, the method comprising:
   receiving, from a second device having a labeling tool, a first message for discovering resources for data labeling;
   transmitting, to the second device, a second message including a resource for unlabeled raw data stored in the first device, the resource for the unlabeled raw data including the unlabeled raw data;
   receiving, from the second device, a third message requesting to perform data labeling, the third message including information related to a label for the unlabeled raw data;
   performing the data labeling of the unlabeled raw data for training an artificial intelligence (AI) model and updating the resource for the unlabeled raw data based on the information related to the label using a reference ontology;
   storing the updated resource as training data based on a structure of the updated resource;
   in response to a fourth message from a third device for retrieving labeled data, transmitting the updated resource to the third device, wherein the updated resource is used as learning data for training the artificial intelligence (AI) model in the third device; and
   training the AI model to perform a predictive operation using the labeled data, determine a loss value based on the labeled data, and update the AI model based on the loss value,
   wherein the structure of the updated resource includes a first attribute indicating that the data is for training, a second attribute indicating a type of labeling for the unlabeled raw data, a third attribute indicating a format of labeling for the unlabeled raw data, a fourth attribute containing annotation contents for the unlabeled raw data based on the format of labeling, and a fifth attribute indicating the reference ontology used to label the unlabeled raw data, and
   wherein the information related to the label for the unlabeled raw data comprises annotations obtained through the labeling tool of the second device.

2. The method of claim 1, wherein the first message comprises at least one of information on a type of data that can be labeled by the labeling tool, information on an annotation to be added, and information on a required amount of data, and
   wherein the second message comprises at least one of information on a required label, information on a labeling target, and information on the type of label.

3. The method of claim 2, wherein the first device comprises a common service entity.

4. The method of claim 1, further comprising:
   receiving, from the third device, the fourth message comprising information indicating an attribute of learning data that is required in the AI model; and
   transmitting, to the third device, a fifth message including the updated resource,
   wherein the fifth message comprises the updated resource including learning data with the attribute indicated by the fourth message.

5. The method of claim 1, wherein the updated resource is a training resource for training data, and
   wherein the updated resource includes seventh information on a common attribute between a first label for first raw data and a second label for second raw data, the first raw data, the second raw data, eighth information on a first annotation in the first label, and ninth information on a second annotation in the second label.

6. The method of claim 1, wherein the updated resource is for raw data,
   wherein the resource includes a parent resource for the label, and
   wherein the parent resource includes at least one sub-resource including information related to the label.

7. The method of claim 1, wherein the updated resource includes a first resource which includes a first reference value for first raw data and a second reference value for second raw data, and a second resource that includes a first representation value describing a first annotation for the first raw data and a second representation value describing a second annotation for the second raw data, and
   wherein reference values included in the first resource and representation values included in the second resource are matched by an order.

8. The method of claim 1, wherein the second attribute indicating the type of labeling for the unlabeled raw data indicates at least one of bounding box, polygonal segmentation, semantic segmentation, 3D cuboids, lines and splines, and key-point and landmark.

9. The method of claim 1, wherein the third attribute indicating the format of labeling for the unlabeled raw data indicates at least one of COCO (common objects in context), pascal VOC (visual object classes), YOLO (you only look once), and customization.

10. The method of claim 1, wherein the fourth attribute containing the annotation contents for the unlabeled raw data based on the format of labeling indicates at least one of a size of the annotation, a shape of the annotation, and a location of the annotation.

11. The method of claim 10, wherein the annotation is described based on the reference ontology that is indicated by the fifth attribute.

12. A first device in a machine-to-machine (M2M) system, comprising:
    a transceiver; and
    a processor coupled with the transceiver and configured to:
    receive, from a second device having a labeling tool, a first message for discovering resources for data labeling;
    transmit, to the second device, a second message including a resource for unlabeled raw data stored in the first device, the resource for the unlabeled raw data including the unlabeled raw data;

receive, from the second device, a third message requesting to perform data labeling, the third message including information related to a label for the unlabeled raw data;

perform the data labeling of the unlabeled raw data for training an artificial intelligence (AI) model and update the resource for the unlabeled raw data based on the information related to the label using a reference ontology;

store the updated resource as training data based on a structure of the updated resource;

in response to a fourth message from a third device for retrieving labeled data, transmit the updated resource to the third device, wherein the updated resource is used as learning data for training the artificial intelligence (AI) model in the third device; and train the AI model to perform a predictive operation using the labeled data, determine a loss value based on the labeled data, and update the AI model based on the loss value, wherein the structure of the updated resource includes a first attribute indicating that the data is for training, a second attribute indicating a type of labeling for the unlabeled raw data, a third attribute indicating a format of labeling for the unlabeled raw data, a fourth attribute containing annotation contents for the unlabeled raw data based on the format of labeling, and a fifth attribute indicating the reference ontology used to label the unlabeled raw data, and wherein the information related to the label for the unlabeled raw data comprises annotations obtained through the labeling tool of the second device.

13. The first device of claim 12, wherein the first device comprises a common service entity.

14. The first device of claim 12, wherein the processor is further configured to:

receive, from the third device, the fourth message comprising information indicating an attribute of learning data that is required in the AI model, and transmit, to the third device, a fifth message including the updated resource, wherein the fifth message comprises the updated resource including learning data with the attribute indicated by the fourth message.

15. The first device of claim 12, wherein the first message comprises at least one of information on a type of data that can be labeled by the labeling tool, information on an annotation to be added, and information on a required amount of data, and wherein the second message comprises at least one of information on a required label, information on a labeling target, and information on the type of label.

16. The first device of claim 12, wherein the updated resource is a training resource for training data, and wherein the updated resource includes seventh information on a common attribute between a first label for first raw data and a second label for second raw data, the first raw data, the second raw data, eighth information on a first annotation in the first label, and ninth information on a second annotation in the second label.

17. The first device of claim 12, wherein the updated resource is for raw data, wherein the resource includes a parent resource for the label, and wherein the parent resource includes at least one sub-resource including information related to the label.

18. The first device of claim 12, wherein the updated resource includes a first resource, which includes a first reference value for first data and a second reference value for second data, and a second resource that includes a first representation value describing a first annotation for the first data and a second representation value describing a second annotation for the second data, and wherein reference values included in the first resource and representation values included in the second resource are matched by an order.

19. The first device of claim 12, wherein the second attribute indicating the type of the labeling for the unlabeled raw data indicates at least one of bounding box, polygonal segmentation, semantic segmentation, 3D cuboids, lines and splines, and key-point and landmark, wherein the fourth attribute containing the annotation contents for the unlabeled raw data based on the format of labeling indicates at least one of a size of the annotation, a shape of the annotation, and a location of the annotation, and wherein the annotation is configured to be described based on the reference ontology that is indicated by the fifth attribute.

* * * * *